(12) United States Patent
Hirono et al.

(10) Patent No.: US 10,603,732 B2
(45) Date of Patent: Mar. 31, 2020

(54) SINTER-BRAZED COMPONENT

(71) Applicant: SUMITOMO ELECTRIC SINTERED ALLOY, LTD., Takahashi, Okayama (JP)

(72) Inventors: Shinichi Hirono, Itami (JP); Reiko Okuno, Itami (JP)

(73) Assignee: SUMITOMO ELECTRIC SINTERED ALLOY, LTD., Takahashi, Okayama (JP)

( * ) Notice: Subject to any disclaimer, the term of this patent is extended or adjusted under 35 U.S.C. 154(b) by 372 days.

(21) Appl. No.: 15/506,528

(22) PCT Filed: Aug. 4, 2015

(86) PCT No.: PCT/JP2015/072028
§ 371 (c)(1),
(2) Date: Feb. 24, 2017

(87) PCT Pub. No.: WO2016/031500
PCT Pub. Date: Mar. 3, 2016

(65) Prior Publication Data
US 2017/0252844 A1   Sep. 7, 2017

(30) Foreign Application Priority Data

Aug. 27, 2014   (JP) ................. 2014-172897

(51) Int. Cl.
*B23K 1/18*      (2006.01)
*B23K 1/19*      (2006.01)
(Continued)

(52) U.S. Cl.
CPC .............. *B23K 1/19* (2013.01); *B23K 1/008* (2013.01); *B23K 1/0008* (2013.01); *B23K 1/18* (2013.01);
(Continued)

(58) Field of Classification Search
CPC ........ B23K 1/19; B23K 1/0008; B23K 1/008; B23K 1/18; B23K 2101/008; F16B 5/08; F16H 57/082
See application file for complete search history.

(56) References Cited

U.S. PATENT DOCUMENTS

2011/0111247 A1*  5/2011  Lemke ................. B23K 1/0008
                                                    428/600

FOREIGN PATENT DOCUMENTS

| JP | 50-064145 A | 5/1975 |
| JP | 52-067757 A | 6/1977 |

(Continued)

OTHER PUBLICATIONS

International Search Report dated Nov. 10, 2015 for corresponding foreign Application No. PCT/JP2015/072028, 2 pp.

*Primary Examiner* — Daniel J. Schleis
*Assistant Examiner* — Kevin C T Li
(74) *Attorney, Agent, or Firm* — United IP Counselors, LLC

(57) ABSTRACT

It is an object of the present invention to effectively suppress the overflow of brazing material from each joint of a sinter-brazed component, such as a planetary carrier, obtained by brazing a plurality of members together. According to the present invention, there is provided a sinter-brazed component obtained by mating and joining a first member having a first bonding surface and a second member having a second bonding surface to each other. Brazing material is provided between the first bonding surface and the second bonding surface. The first bonding surface has a first recess, the first recess having an inner peripheral wall and a bottom surface. The inner peripheral wall extends along and on an inner side of a profile line of the first bonding surface.

9 Claims, 4 Drawing Sheets

(51) Int. Cl.
*F16B 5/08* (2006.01)
*B23K 1/008* (2006.01)
*B23K 1/00* (2006.01)
*F16H 57/08* (2006.01)
*B23K 101/00* (2006.01)

(52) U.S. Cl.
CPC .............. *F16B 5/08* (2013.01); *F16H 57/082* (2013.01); *B23K 2101/006* (2018.08); *B23K 2101/008* (2018.08)

(56) References Cited

FOREIGN PATENT DOCUMENTS

| | | | | |
|---|---|---|---|---|
| JP | 53067659 A | * | 6/1978 | |
| JP | S5367659 A | | 6/1978 | |
| JP | 63-067137 A | | 3/1988 | |
| JP | 08-267224 A | | 10/1996 | |
| JP | 2001138041 A | | 5/2001 | |
| JP | 2002079372 A | | 3/2002 | |
| JP | 2004-050207 A | | 2/2004 | |
| JP | 2008302414 A | | 12/2008 | |
| JP | 2008302414 A | * | 12/2008 | |
| JP | 2008302415 A | | 12/2008 | |
| JP | 2008302415 A | * | 12/2008 | |
| JP | 2009148779 A | * | 7/2009 | ........... F16H 57/082 |
| JP | 2009148779 A | | 7/2009 | |
| JP | 2009242821 A | | 10/2009 | |
| JP | 2013-098594 A | | 5/2013 | |

* cited by examiner

SINTER-BRAZED COMPONENT

CROSS-REFERENCE TO RELATED APPLICATIONS

This application is the U.S. National Phase of PCT International Application No. PCT/JP2015/072028, filed on Aug. 4, 2015. That application claims priority to Japanese Patent Application No. 2014-172897, filed Aug. 27, 2014. The contents of both applications are herein incorporated by reference in their entirety.

TECHNICAL FIELD

The present invention relates to a sinter-brazed component obtained by brazing a plurality of members together. Specifically, the present invention relates to a sinter-brazed component for which a measure that is effective for preventing the overflow of brazing material from each joint between members is taken.

BACKGROUND ART

Sinter-brazed components obtained by brazing a plurality of members together include planetary carriers that are included in transmissions of automobiles.

Planetary carriers that are employed in many cases are manufactured by powder metallurgy. Sintered planetary carriers manufactured by powder metallurgy each include a member having a plurality of columns extending from one end face thereof, and a mating member mated to the tips of the columns, the two members being mated and brazed to each other at respective mating surfaces.

An exemplary technique concerning brazing performed in manufacturing components of such a kind is proposed by PTL 1, in which guide grooves extending radially are provided in a bonding surface, whereby molten brazing material is spread quickly over the entirety of the bonding surface.

Another technique is proposed by PTL 2, in which bonding surfaces have a recess and a projection, respectively, adapted to be fitted to each other, and the amount of brazing material provided between the bonding surfaces is regulated by adjusting the depth of the recess and the height of the projection.

CITATION LIST

Patent Literature

PTL 1: Japanese Unexamined Patent Application Publication No. 2001-138041
PTL 2: Japanese Unexamined Patent Application Publication No. 2002-79372

SUMMARY OF INVENTION

Technical Problem

In the case where two members are joined to each other while brazing material is supplied into the gap between their respective mating surfaces, the overflow of the brazing material from the joint is to be discussed.

The overflow of brazing material is considered to be caused by several factors. Currently taken measures for the possible overflow are not really satisfactory.

There are inevitable variations in some factors such as the amount of brazing material supplied, the temperatures in different areas of the bonding surface during brazing, and the flow resistances applied to molten brazing material flowing along different areas of the bonding surface. Such variations produce variations in the flow of brazing material among different areas of the bonding surface.

If the members to be brazed to each other are sintered components or powder compacts for that purpose, factors such as the density variation among different areas of the bonding surface may also change the flow of brazing material.

In the configuration disclosed by PTL 1, the above factors prevent the molten brazing material from flowing evenly over the entirety of the bonding surface and gather the molten brazing material in some areas where the filler can easily flow. Consequently, in such areas where the brazing material gathers, the force of preventing the overflow that is exerted by the surface tension acting on the brazing material on the outer edge of the bonding surface cannot bear the force exerted by the brazing material that is about to overflow, and the brazing material eventually overflows in some areas to the outside of the bonding surface, presumably.

If such overflow occurs in, for example, a planetary carrier, some problems may occur such as the interference of the overflowed portion of the brazing material with a pinion included in the carrier, depending on where the overflow occurs.

The known measures cannot completely solve the problem of overflow. Therefore, in the case of sintered planetary carriers each formed of a plurality of members that are brazed together, all products are subjected to inspection after the brazing.

Then, any products that have caused overflow are subjected to the removal of the overflowed brazing material, if possible. Any products from which the overflowed brazing material is not removable are disposed of as defective products. However, such a measure is not preferable in terms of productivity and product cost.

In view of the above, it is an object of the present invention to effectively suppress the overflow of brazing material from each joint of a sinter-brazed component, such as a planetary carrier, obtained by brazing a plurality of members together.

Solution to Problem

According to an aspect of the present invention, there is provided a sinter-brazed component obtained by mating and joining a first member having a first bonding surface and a second member having a second bonding surface to each other. Brazing material is provided between the first bonding surface and the second bonding surface. The first bonding surface has a first recess, the first recess having an inner peripheral wall and a bottom surface. The inner peripheral wall extends along and on an inner side of a profile line of the first bonding surface.

Advantageous Effects of Invention

According to the present invention, the overflow of the brazing material from the first joint and the second joint to the outside is effectively suppressed, and a sinter-brazed component with no overflow of brazing material or a brazing component with only a slight amount of overflow that does not affect the product function is provided.

Hence, the post-brazing inspection of all products and the removal of overflowed brazing material can be omitted, and the productivity can therefore be improved. Moreover, since the rate of defective products is reduced, cost reduction is achieved. Furthermore, the joining strength between the first member and the second member can be stabilized.

DESCRIPTION OF EMBODIMENTS

Description of Embodiment of Invention

Figure 1:
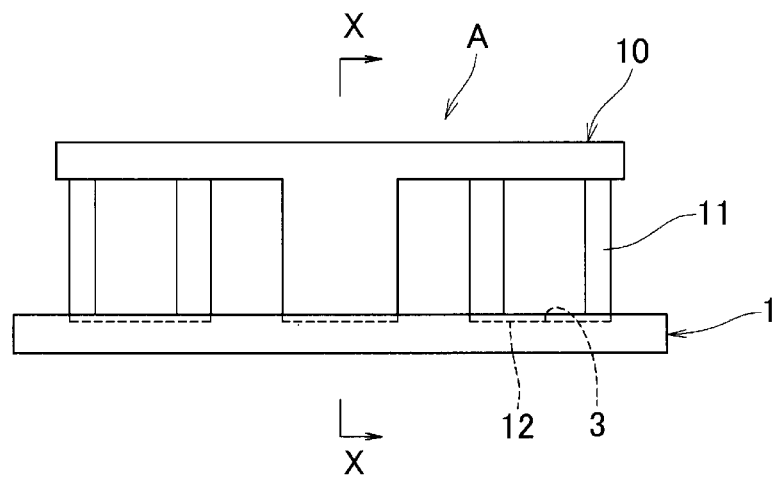
FIG. 1 is a front view of a sinter-brazed component according to an embodiment of the present invention.
Figure 2:
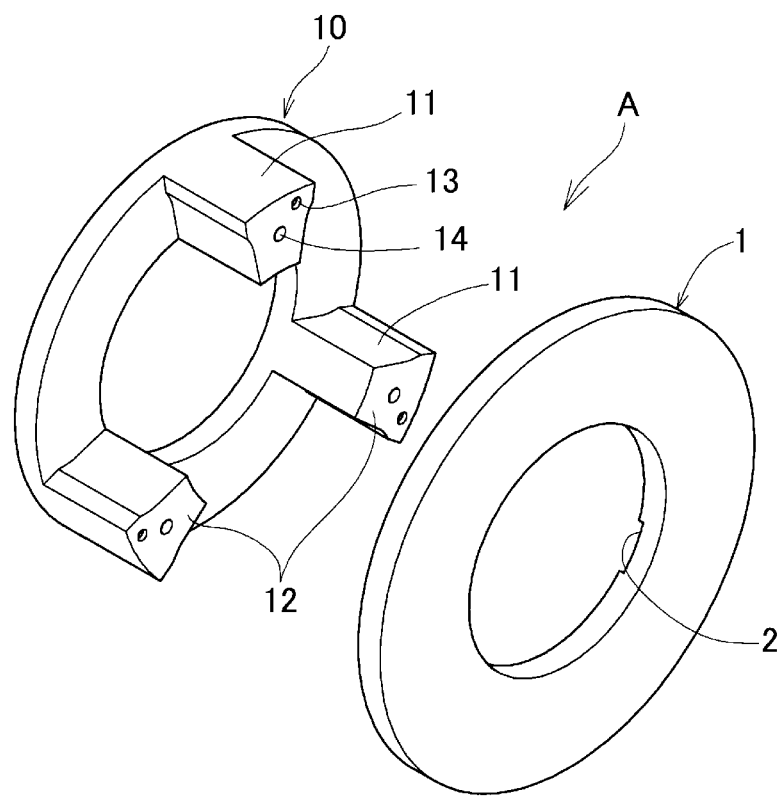
FIG. 2 is an exploded perspective view of the sinter-brazed component illustrated in FIG. 1.
Figure 3:
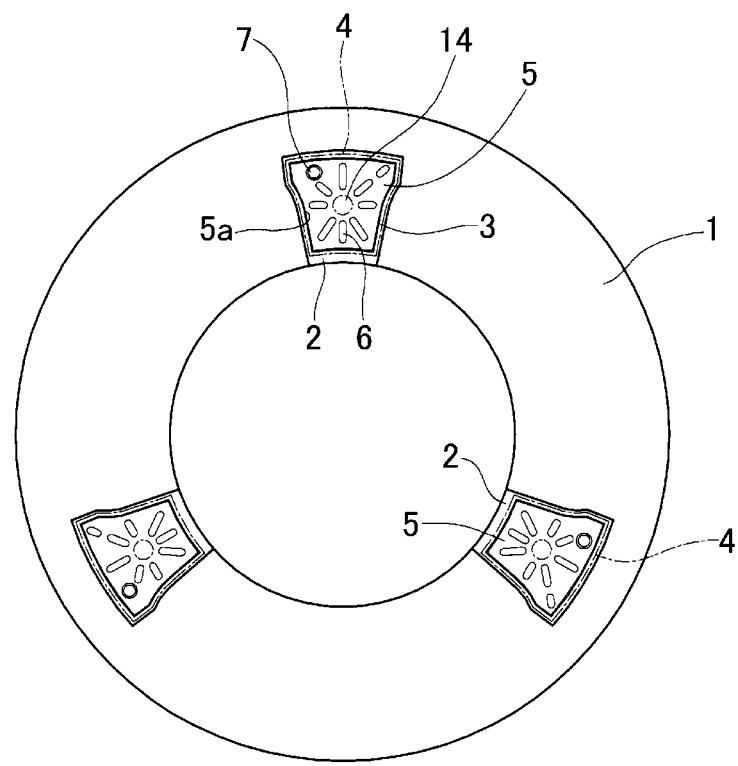
FIG. 3 is an end view, on a joining side, of a first member of the sinter-brazed component illustrated in FIG. 1.

A sinter-brazed component according to an embodiment of the present invention is obtained by mating and joining a first member having a first bonding surface and a second member having a second bonding surface to each other. Brazing material is provided between the first bonding surface and the second bonding surface. The first bonding surface has a first recess having an inner peripheral wall and a bottom surface. The inner peripheral wall extends along and on the inner side of the profile line of the first bonding surface.

Herein, the first member refers to a member that is positioned on the lower side when brazing is performed, and the second member refers to a member that is stacked on the first member when brazing is performed.

In the sinter-brazed component configured as above, heated and molten brazing material is supplied into the gap between the first bonding surface and the second bonding surface by capillary action.

In this step, the molten brazing material is dammed by the inner peripheral wall of the first recess provided in the first bonding surface and does not go over the inner peripheral wall instantly.

The molten brazing material dammed by the inner peripheral wall of the first recess continues to flow along the inner peripheral wall until the recess is filled with the molten brazing material. When the recess becomes full, the molten brazing material starts to overflow from the recess.

Since the molten brazing material is dammed by the inner peripheral wall, serving as a bank, of the first recess and is retained within the recess as described above until the first recess becomes full, the molten brazing material is less likely to flow only in specific directions.

In addition, by the time the molten brazing material starts to overflow from the recess, the amount of brazing material remaining on the supply side is reduced and the flow energy of the molten brazing material becomes smaller than in a case where no first recess is provided. Such behaviors act as effective factors, and the overflow of brazing material from the joint is effectively suppressed.

The recess of the sinter-brazed component configured as above preferably has a depth of 0.03 mm to 0.08 mm.

If the first recess has a depth of 0.03 mm or greater, the effect of providing the first recess (the regulation of the flow of brazing material by the inner peripheral wall) is exerted satisfactorily. If the first recess has a depth of 0.08 mm or smaller, the amount of brazing material wasted can be reduced. If the first recess has a depth of about 0.08 mm or smaller, no considerable reduction in the joining strength (a force that separates the bonding surfaces from each other) does not occur. Therefore, joining strength of a required level can be provided stably.

It is preferable that the inner peripheral wall of the first recess extends along the profile line of the first bonding surface such that distances from different points of the profile line do not vary widely.

If the variation in the distance is small, the resistance applied to the molten brazing material moving up to the outer peripheries of the bonding surface is equalized and the local concentration of the moving energy is suppressed. Hence, the effect of suppressing the overflow is further stabilized.

It is also preferable that the inner peripheral wall have a similar shape as the profile line of the first bonding surface.

If the two have similar shapes, the variation in the distance between the inner peripheral wall and the profile line of the first bonding surface does not become large.

It is also preferable that the bottom surface of the recess have a projection that regulates the flow of the molten brazing material.

Depending on the shape of the bonding surface, the length of movement of the brazing material and the resistance applied to the moving brazing material may vary while the brazing material spreads over the bonding surface, or the brazing material may pool (stagnate) at some points on the bonding surface. If the above projection is provided, such variations in the length of movement and in the resistance against the movement can be reduced, allowing the molten brazing material to spread over the entirety of the bonding surface quickly and smoothly. The projection has a height that is equal to or smaller than the depth of the first recess.

If the component having the first recess is formed by molding, the angle of inclination of the inner peripheral wall with respect to the first bonding surface is preferably set to about 30° to 60° (an angle of inclination with respect to a line perpendicular to the bonding surface=60° to 30°).

If the angle of inclination is too small, the effect of providing the first recess (the effect of preventing the overflow of molten brazing material by the inner peripheral wall) is degraded. In contrast, if the angle of inclination is too large, the releasability of the mold (the mold removability) is lowered. If the first member is a powder compact, a problem arises in that, for example, the surface of the inner peripheral wall of the first recess provided in the compact may peel.

In addition, if the second member has columns on one side thereof and the tips of the columns are mated and brazed to the first member, another preferable embodiment may be employed in which the first member has second recesses that receive the columns of the second member. The bottom surface of each of the second depressions forms a bonding surface having the first recess. Furthermore, the profile line of the bonding surface is spaced apart by a certain distance from the edges of the second recesses.

In such a configuration, a gap is produced between each of the columns of the second member and the edge of a corresponding one of the second recesses. Therefore, even if the brazing material should overflow from the joint, the overflowed brazing material stays within the gap and is less likely to flow into areas where the brazing material may affect the product quality.

Detailed Description of Embodiments of Invention

A specific example of the sinter-brazed component according to the embodiment of the present invention will now be described with reference to the drawings. The present invention is not limited to the following exemplary embodiments. The scope of the present invention is defined by the appended claims and is intended to encompass all modifications within the context and scope equivalent to the claims.

A sinter-brazed component A illustrated in FIG. 1 is a planetary carrier obtained by brazing a first member 1 having a shaft hole and a second member 10 having a plurality of columns 11 extending from one end face of a base portion thereof to each other. The first member 1 and the second member 10 are each a sintered member that is sintered when or before the brazing.

The first member 1 has second recesses 2 (see FIGS. 2 to 7 also) provided in one end face thereof and arranged at regular pitches in the circumferential direction. A portion of the bottom surface of each of the second recesses 2 forms a first bonding surface 3. A first recess 5 is provided on the inner side of a profile line 4 of the first bonding surface 3. A plurality of flow-regulating projections 6 that regulate the flow of molten brazing material and a positioning projection 7 are provided in the first recess 5.

The first recess 5 has an inner peripheral wall 5a extending along and on the inner side of the profile line 4 (see FIGS. 4 and 5) of the first bonding surface 3. The inner peripheral wall 5a produces a level difference in the first bonding surface 3.

In the sinter-brazed component A illustrated in the drawings, the first recess 5 has a depth d (see FIG. 8) of 0.03 mm, the inner peripheral wall 5a has an angle of inclination θ (see FIG. 8) of 30°, there is a distance L1 (see FIGS. 4 and 5) of 0.5 mm from the first recess 5 to the profile line 4 of the first bonding surface 3, there is a distance L2 (see FIGS. 4 and 5) of 0.7 mm from the profile line 4 to the edge of each of the second recesses 2, the flow-regulating projections 6 each have a height h (see FIG. 8) of 0.03 mm, and the flow-regulating projections 6 each have a width w (see FIGS. 4 and 5) of 1.0 mm. The positioning projection 7 has a truncated conical shape and is taller than the flow-regulating projections 6.

The distances L1 and L2 are each a distance in a direction orthogonal to the profile line 4.

The positioning projection 7 is fitted into a positioning recess 13 (see FIG. 7) provided in a second bonding surface 12 of each of the columns 11.

The flow-regulating projections 6 are only preferable elements. The positioning projection 7 and the positioning recess 13 are also provided according to need and are not essential. The first member 1 and the second member 10 can be positioned with respect to each other even without the positioning projection 7 and the positioning recess 13. For example, the first member 1 and the second member 10 can be positioned by bringing a part of the outer periphery of each of the columns 11 into contact with the edge of a corresponding one of the second recesses 2.

The columns 11 of the second member 10 of the sinter-brazed component illustrated in the drawings are provided in the same number as the first recesses 5 and at regular angular pitches. Alternatively, the columns may be arranged at irregular angular pitches. While the end faces at the tips of the columns 11 illustrated in the drawings have the same shape as the first bonding surfaces 3, the end faces at the tips of the columns 11 may have a different shape from the first bonding surfaces 3. The end faces at the tips of the columns 11 serve as the second bonding surfaces 12.

The second member 10 has brazing material-receiving spaces 14 provided in the respective second bonding surfaces 12. The brazing material-receiving spaces 14 are provided in regions to be mated to the respective first recesses 5 and receive brazing material chips 15, respectively, that are put thereinto (see FIGS. 6 and 7).

It is preferable that the brazing material-receiving spaces 14 each have a cup-like shape having a bottom surface as illustrated in the drawings so that the residue that may be left therein after the brazing material is melted is not discharged to the outside.

In the case of the sinter-brazed component A (a sintered planetary carrier) according to the embodiment, the second member 10 is placed on a temporary mount with the second bonding surfaces 12 thereof facing upward, and the brazing material chips 15 are put into the respective brazing material-receiving spaces 14.

Subsequently, the first member 1 is placed over the tips of the columns 11 with the first bonding surfaces 3 thereof being mated to the respective second bonding surfaces 12. The stack of the first member 1 and the second member 10 is turned over such that the first member 1 is positioned on the lower side. Then, the stack is put into a furnace for brazing.

In the sinter-brazed component A manufacture as described above, the gaps between the first bonding surfaces 3 and the second bonding surfaces 12 are completely filled with brazing material 15a supplied thereinto. When the brazing material 15a is solidified, the first member 1 and the second member 10 are joined to each other.

Because of the effect exerted by the first recesses 5, the sinter-brazed component A obtained as above has no or substantially no overflow of brazing material from the joints.

The distance L1 from the inner peripheral wall 5a of each of the first recesses 5 of the sinter-brazed component A to the profile line 4 of a corresponding one of the first bonding surfaces 3 is preferably set to about 0.5 mm at shortest so that the effect of preventing the overflow of brazing material is enhanced. If the distance L1 is 0.5 mm or longer, the second bonding surfaces 12 are supported more stably by the respective first bonding surfaces 3 during brazing.

Figure 5:
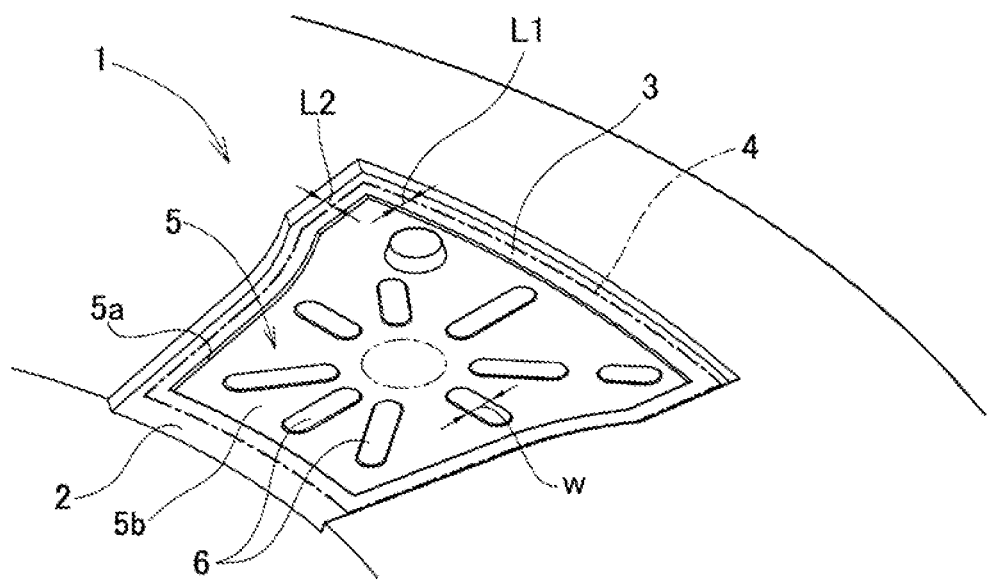
FIG. 5 is an enlarged perspective view of a bonding surface illustrated in FIG. 3.
Figure 6:
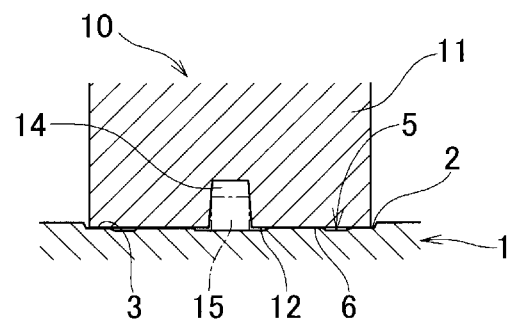
FIG. 6 is an enlarged view of a section taken along line X-X illustrated in FIG. 1.
Figure 7:
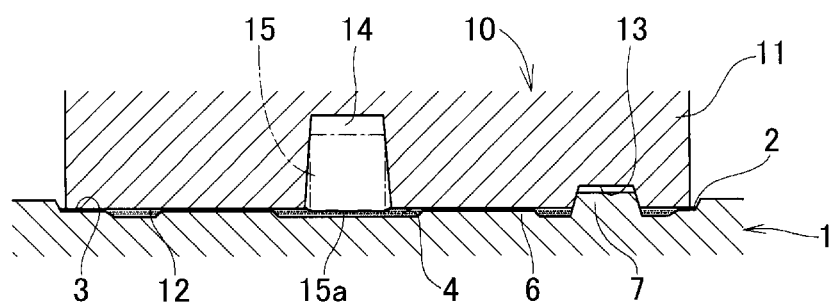
FIG. 7 is a further enlarged view of the section at a joint illustrated in FIG. 6.

It is preferable that the flow-regulating projections 6 be spaced apart from the inner peripheral wall 5a of a corresponding one of the first recesses 5 as illustrated in FIG. 5 so that flow-regulating projections 6 do not hinder the flow of molten brazing material along the inner peripheral wall 5a.

Figure 4:
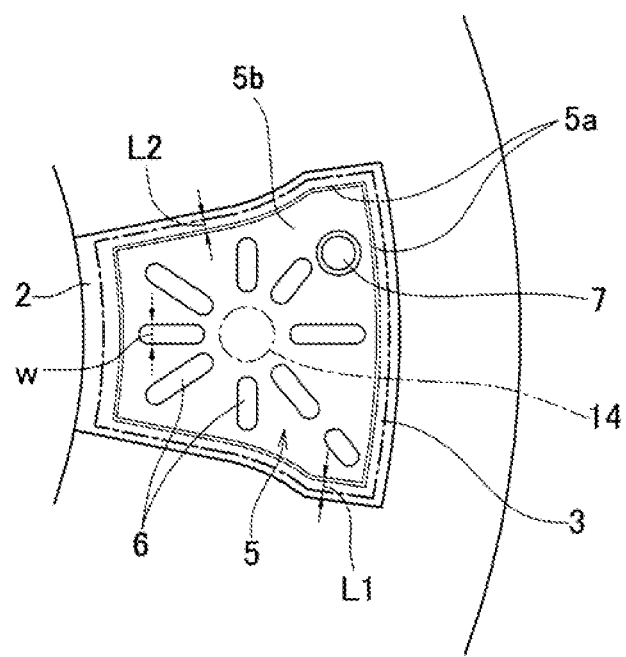
FIG. 4 is an enlarged view of a part of FIG. 3.
Figure 9:
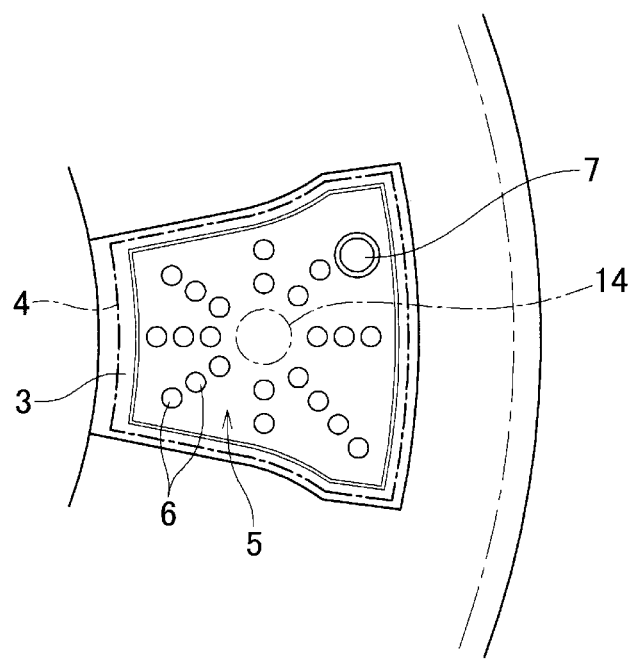
FIG. 9 is an end view illustrating a modification of projections for regulating the flow of molten brazing material that are provided in a recess.
Figure 10:
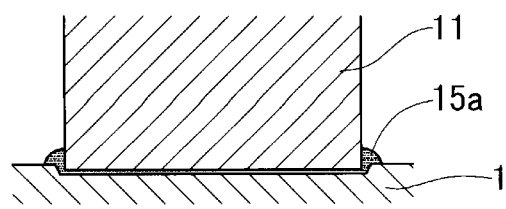
FIG. 10 is a sectional view of a known sinter-brazed component and illustrates an exemplary state of overflow of brazing material.

The flow-regulating projections 6 may be either oblong projections as illustrated in FIGS. 4 and 5 or dispersed dot-like projections as illustrated in FIG. 9. Preferably, the flow-regulating projections 6 each have a shape that does not produce any pools of brazing material in the first recess 5 so that the flow of molten brazing material does not gather locally. Providing isles as passageways for molten brazing material between the projections (so that each of the projections do not become too long) also contributes to lower the probability that any pools of brazing material may be produced.

In the sinter-brazed component A according to the embodiment, the first recesses 5 are provided in the respective first bonding surfaces 3. The effect of preventing the overflow can also be produced in a case where the first member has columns at the tips of which the first bonding surfaces 3 having the first recesses 5 are provided.

In such an embodiment, the member having columns is regarded as the first member, and the member having no columns is regarded as the second member. The member having columns (the first member in this embodiment) is positioned on the lower side with the tips of the columns facing upward, and the member having no columns (the second member in this embodiment) is placed over the tips of the columns. In this state, brazing is performed. Consequently, the overflow of brazing material from the bonding surfaces is prevented by the effect exerted by the first recesses 5 provided in the first bonding surfaces 3 at the tips of the columns.

In this embodiment, the brazing material-receiving spaces 14 are provided in the second member having no columns. The brazing material-receiving spaces 14 provided in the second member having no columns according to this embodiment may be through holes, instead of cup-shaped holes.

The scope of application of the present invention is not limited to the application to sintered components. The present invention is also applicable to components such as a component obtained by machining an ingot metal, a forged component, and a cast component, or components other than planetary carriers.

The present invention is also applicable to a component including more than two members, including a third member in addition to the first and second members, that are brazed to one another.

EXAMPLES

Sintered planetary carriers each having an outside diameter of ϕ150 mm and an inside diameter ϕ of 30 mm and including a combination of a first member and a second member, which has four columns (bridges), were manufactured experimentally.

The experimental products were of two kinds: ones with first recesses provided in the bonding surfaces of the first member (recessed products) and ones with no first recesses (recess-less products).

Figure 8:
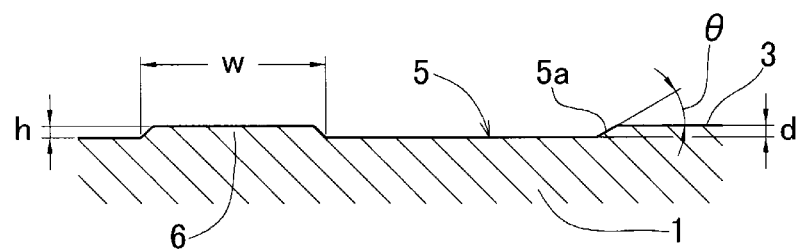
FIG. 8 is an enlarged sectional view of the bonding surface and a part of a recess.

The dimensions of each of the first recesses of the first member, that is, the depth d illustrated in FIG. 8, the distances L1 and L2 illustrated in FIGS. 4 and 5, the height h of the projections provided in the first recess and that regulate the flow of molten brazing material illustrated in FIG. 8, and the width w of the flow-regulating projections illustrated in FIGS. 4 and 5, were set to the respective values given in Detailed Description of Embodiments.

The joining strength (the tensile strength) at the brazed part between the first member and the second member of each of the planetary carriers of the two kinds obtained as above were measured with a commercially available tension tester.

Table 1 below summarizes the standard deviation a of the joining strength (the tensile strength) of thirty samples that was calculated for each of the two kinds of products. Table 1 shows that the variation in the joining strength of the recessed products is remarkably small. Such a small variation is attributed to the elimination of the overflow of brazing material.

TABLE 1

Standard deviation of the joining strength (the tensile strength) measurements (the number of samples: 30)

| | Recess-less products | Recessed products |
|---|---|---|
| σ | 12.22 kN | 4.40 kN |

In terms of stabilizing the quality of a component obtained by brazing a plurality of members to one another, it is important that the variation in the joining strength at the joints between those members is small. According to the results of the experiment summarized in Table 1, the range of the variation in the case where the first bonding surfaces had the first recesses was about ⅓ of that in the case where no first recesses were provided.

In the above experiment, some overflow of brazing material from the joints were recognized in the recess-less products, whereas no overflow of brazing material was recognized visually in any of the thirty samples as the recessed products.

Although further verification is necessary to omit the step of inspecting all products, the present invention is highly expected to provide an effective measure in omitting the step of inspecting all products.

REFERENCE SIGNS LIST

A sinter-brazed component
1 first member
2 second recess
3 first bonding surface
4 profile line
5 first recess
5a inner peripheral wall
5b bottom surface
6 flow-regulating projection
7 positioning projection
10 second member
11 column
12 second bonding surface
13 positioning recess
14 brazing material-receiving space
15 brazing material chip
15a brazing material in gap between bonding surfaces
d depth of first recess 5
L1 distance from first recess 5 to profile line 4 of first bonding surface 3
L2 distance from profile line 4 to edge of second recess 2
h height of flow-regulating projection 6
w width of flow-regulating projection 6

The invention claimed is:

1. A sinter-brazed component, comprising:
a first member having a first bonding surface, the first bonding surface having a first recess with an inner peripheral wall and a bottom surface, the bottom surface located lower than the first bonding surface, the inner peripheral wall extending to surround the outer periphery of the bottom surface, the inner peripheral wall located higher than the bottom surface; and
a second member having a second bonding surface to be joined to the first bonding surface of the first member, wherein a brazing material is provided between the first bonding surface and the second bonding surface, the second member has a brazing material receiving space which is an opening disposed in the second bonding surface, and the first member has a plurality of flow-regulating projections projected from the bottom surface of the first recess, the plurality of flow-regulating projections arranged radially around a position corresponding to the brazing material receiving space, the plurality of flow-regulating projections spaced apart from the inner peripheral wall of the first recess.

2. The sinter-brazed component according to claim 1, wherein the first recess has a depth of 0.03 mm to 0.08 mm.

3. The sinter-brazed component according to claim 1, wherein the inner peripheral wall extends along a profile line of the first bonding surface such that distances from different points of the profile line to the inner peripheral wall are smaller than a width of each of the plurality of flow-regulating projections.

4. The sinter-brazed component according to claim 1, wherein the inner peripheral wall has a same shape as a profile line of the first bonding surface.

5. The sinter-brazed component according to claim 1, wherein the first member and the second member are each a compact, and the inner peripheral wall has an angle of inclination of 30° to 60° with respect to the first bonding surface.

6. The sinter-brazed component according to claim 1, wherein the first member and the second member are each a sintered member, the sinter-brazed component includes a plurality of columns extending from one end face of the second member and each having the second bonding surface at a tip, and the first member and the second member are brazed to each other and form a planetary carrier.

7. The sinter-brazed component according to claim 1, wherein the first member and the second member are each a sintered member, the sinter-brazed component includes a plurality of columns extending from one end face of the first member and each having the first bonding surface at a tip, and the first member and the second member are brazed to each other and form a planetary carrier.

8. The sinter-brazed component according to claim 1, wherein a first one of a plurality of first recesses extends to a second one of the plurality of first recesses at a distal end from a brazing material-receiving space.

9. The sinter-brazed component according to claim 1, wherein a radially outer portion of the first member steps down to a second recess.

* * * * *